United States Patent [19]
Guioth et al.

[11] Patent Number: 4,735,989
[45] Date of Patent: Apr. 5, 1988

[54] AQUEOUS COATING COMPOSITION BASED ON A CATIONIC BINDER

[75] Inventors: Chantal H. Guioth, Rantigny; Etienne G. Maze, Breuil le Vert; Jean J. Trescol, Nogent sur Oise, all of France

[73] Assignee: Akzo NV, Arnhem, Netherlands

[21] Appl. No.: 55,300

[22] Filed: May 29, 1987

Related U.S. Application Data

[62] Division of Ser. No. 882,378, Jul. 7, 1986.

[30] Foreign Application Priority Data

Jul. 5, 1985 [NL] Netherlands ............ 8501938

[51] Int. Cl.$^4$ ............................................. C08L 37/00
[52] U.S. Cl. ...................... 524/548; 524/553; 524/555; 524/808; 524/812; 524/820; 524/832
[58] Field of Search ............. 524/548, 553, 555, 808, 524/812, 820, 832

[56] References Cited

U.S. PATENT DOCUMENTS

| | | | |
|---|---|---|---|
| 3,853,803 | 12/1974 | Anderson et al. | 524/812 |
| 3,954,588 | 5/1976 | Hazan et al. | 204/181.1 |
| 4,134,816 | 1/1979 | Bosso et al. | 204/181.7 |
| 4,511,446 | 4/1985 | Abbey et al. | 204/181.7 |
| 4,517,343 | 11/1985 | Schupp et al. | 204/181.7 |
| 4,554,212 | 11/1985 | Diefenbach et al. | 204/181.7 |
| 4,579,889 | 4/1986 | Kaffen et al. | 204/181.7 |
| 4,600,485 | 7/1986 | Patzschke et al. | 204/181.7 |
| 4,608,139 | 8/1986 | Craun et al. | 204/181.7 |
| 4,608,314 | 8/1986 | Turpin et al. | 204/181.7 |
| 4,624,762 | 11/1986 | Abbey et al. | 204/181.7 |
| 4,661,223 | 4/1987 | Zedler et al. | 204/181.7 |

FOREIGN PATENT DOCUMENTS

0104683 4/1984 European Pat. Off. .
0021404 2/1980 Japan .

*Primary Examiner*—Joseph L. Schofer
*Assistant Examiner*—J. M. Reddick
*Attorney, Agent, or Firm*—Parkhurst & Oliff

[57] ABSTRACT

A process is provided for coating an electrically conductive substrate with an aqueous coating composition containing a cationic binder wherein the binder is obtained by polymerization of 100 parts by weight of a specific monomer mixture in the presence of 1–20 parts by weight of an epoxy group-free adduct of a bisphenol bisglycidyl ether and an ethylenically unsaturated amido amine. The ethylenically unsaturated amido amine, in turn, is the product of a polyamine having 1–2 primary amino groups and 1–2 secondary amino groups and an ethylenically unsaturated monocarboxylic acid having 18–24 carbon atoms. The invention also pertains to the aqueous coating composition as such.

15 Claims, No Drawings

AQUEOUS COATING COMPOSITION BASED ON A CATIONIC BINDER

This is a division of application Ser. No. 882,378 filed July 7, 1986.

The invention relates to a process for coating an electrically conductive substrate with an aqueous coating composition based on a cationic binder. The cationic binder is obtained by polymerization of a monomer mixture in the presence of a polyethylenically unsaturated compound, amino groups present in the binder being at least partially neutralized with an acid. The monomer mixture consists of (a) 1-30% by weight of a hydroxy(cyclo)alkyl (meth)acrylate of which the (cyclo)alkyl group contains 2-8 carbon atoms, (b) 4-45% by weight of an amino (meth)acrylate of the formula

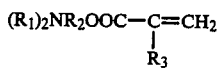

where at least one of the groups $R_1$ is an organic group containing 1-12 carbon atoms and the other group $R_1$ is an organic group containing 1-12 carbon atoms or a hydrogen atom, or the two groups $R_1$, together with the nitrogen atom attached thereto, form a heterocyclic group, $R_2$ is a hydrocarbon group containing 2-12 carbon atoms and $R_3$ is a hydrogen atom or a methyl group, (c) 0-80% by weight of a monovinyl aromatic hydrocarbon containing 8-14 carbon atoms, and (d) 0-50% by weight of a different monoethylenically unsaturated monomer containing 2-20 carbon atoms. A process of the type indicated above is known from European Patent Application No. 104,683, the polyethylenically unsaturated compound proposed in it being a particular polyester. The resulting coating satisfactorily covers edges and displays good resistance to chemical attack and outdoor exposure. It has now been found, however, that the use of a different polyethylenically unsaturated compound results in a further improvement of the gloss and particularly the resistance to corrosion while the above properties are kept at the same level.

The process according to the invention is characterized in that the polyethylenically unsaturated compound is an epoxy group-free adduct of a bisphenol bisglycidyl ether and an ethylenically unsaturated amido amine formed from (a) a polyamine having 1-2 primary amino groups and 1-2 secondary amino groups and (b) an ethylenically unsaturated monocarboxylic acid having 18-24 carbon atoms. The adduct is present in an amount of 1-20 parts by weight per 100 parts by weight of the monomer mixture.

Examples of hydroxy(cyclo)-alkyl (meth)acrylates suitable for use in the monomer mixture include hydroxyethyl acrylate, hydroxyethyl methacrylate, hydroxypropyl acrylate, hydroxypropyl methacrylate, hydroxybutyl acrylate, hydroxyhexyl acrylate, hydroxyoctyl acrylate and hydroxycyclohexyl acrylate. It is preferred that use should be made of hydroxyalkyl (meth)acrylates, more particularly hydroxyethyl acrylate and/or hydroxypropyl methacrylate. It is preferred that the monomer mixture should contain 5-24% by weight of hydroxy(cyclo)alkyl (meth)acrylate. As used herein, the term "hydroxy(cyclo)alkyl (meth)acrylates" refers to hydroxyalkyl acrylates, hydroxyalkyl methacrylates, hydroxycycloalkyl acrylates and/or hydroxycycloalkyl methacrylates.

Examples of amino (meth)acrylates suitable for use in the monomer mixture include methylaminoethyl (meth)acrylate, dimethylaminoethyl (meth)acrylate, diethylaminoethyl (meth)acrylate, propylaminoethyl (meth)acrylate, tert. butylaminoethyl (meth)acrylate, hexylaminobutyl (meth)acrylate, cyclohexylaminoethyl (meth)acrylate, dimethylcyclohexylaminoethyl (meth)acrylate, octylaminoethyl (meth)acrylate, dodecylaminoethyl (meth)acrylate, pyridylethyl (meth)acrylate and the chloride or sulphate of trimethylammoniumethyl (meth)acrylate. It is preferred that use should be made of a (di)alkylamino (meth)acrylate of which the alkyl group(s) has (have) 1-4 carbon atoms. More particularly, use is made of a β-(di)alkylaminoethyl (meth)acrylate of which the alkyl group(s) has (have) 1-4 carbon atoms, for example: β-dimethylaminoethyl (meth)acrylate and β-diethylaminoethyl (meth)acrylate. It is preferred that the monomer mixture should contain 7-35% by weight, more particularly 7-28% by weight of amino (meth)acrylate.

The monomer mixture may contain as a third component a monovinyl aromatic hydrocarbon having 8-14, preferably 8-10 carbon atoms. Representative examples include styrene, α-methyl styrene, vinyl toluene and vinyl naphthalene. It is preferred that use should be made of styrene and/or vinyl toluene. It is preferred that the monomer mixture should contain 10-70% by weight of the monovinyl aromatic hydrocarbon.

Finally, the monomer mixture contains 0-50, preferably 0-45% by weight of some other monoethylenically unsaturated monomer having 2-20 carbon atoms, such as acrylic or methacrylic esters, for example: methyl methacrylate, ethyl acrylate, glycidyl methacrylate, butyl acrylate, 2-ethylhexyl acrylate, dodecyl acrylate and hexadecyl acrylate; nitriles, for example: acrylonitrile and methacrylonitrile; and compounds such as vinyl chloride, vinyl acetate and vinyl propionate; carboxylic acids such as acrylic acid, methacrylic acid, crotonic acid, itaconic acid and maleic acid may generally be applied in an amount not higher than about 1% by weight.

The adduct to be used according to the invention is built up from particular bisglycidyl ethers and particular unsaturated amido amines. As suitable bisphenol bisglycidyl ethers may be mentioned the bisglycidyl ethers of a bis(4-hydroxyphenyl)alkane of which the alkane group has 1-4 carbon atoms, for instance the bisglycidyl ether of bis(4-hydroxyphenyl)methane and that of bis(4-hydroxyphenyl)-2,2-propane. It is preferred that the bisglycidyl ethers have an epoxy equivalent weight of 180-4000, more particularly 450-2000.

Examples of suitable polyamines that may be used as starting compounds for the amido amine include 3-amino-1-(methylamino)propane, 3-amino-1-(cyclohexylamino)propane, N-(2-hydroxyethyl)ethylene diamine, more particularly polyalkylene polyamines of the formula

wherein the group $R_1$ and the n groups $R_2$ may be the same or different and represent an alkylene group containing 2-6, preferably 2-4 carbon atoms and n is 1 or 2. By an alkylene group is also to be understood here a cycloalkylene group. Representative polyalkylene polyamines include diethylene triamine, dipropylene triamine, dibutylene triamine, dihexylene triamine, triethylene triamine or polyamino compounds having different alkylene groups in a molecule, for instance: $H_2N(CH_2)_2NH(CH_2)_3NH_2$ and $H_2N(CH_2)_3NH(CH_2)_2NH(CH_2)_3NH_2$ or mixtures of the above-envisaged compounds. The last-mentioned compound may be prepared for instance by the addition of ethylene diamine to acrylonitrile, followed by hydrogenation of the product thus prepared.

As suitable ethylenically unsaturated monocarboxylic acids containing 18-24 carbon atoms that may be used as the other starting compound for the amido amine may be mentioned aliphatic monocarboxylic acids having one or more conjugated or unconjugated double C—C bonds, such as linseed oil fatty acid, safflower oil fatty acid, soy-bean oil fatty acid, tall oil fatty acid, wood oil fatty acid, sunflower oil fatty acid, castor oil fatty acid, ricinoleic acid, linoleic acid, linolenic acid, oleic acid and/or erucic acid. The above-envisaged carboxylic acids may optionally be used in dimerized form or mixed with one or more dicarboxylic acids.

The amido amine may be built up from the carboxylic acid and one or more polyamines in any well-known or suitable manner, for instance by bringing the reaction components into reaction with each other at a temperature generally in the range of 100°-220° C., preferably 115°-190° C.

The reaction between the bisglycidyl ether and the unsaturated amido amine may be carried out in any well-known or suitable manner, optionally in an organic solvent, at a temperature generally in the range of 0°-100° C., preferably 15°-70° C., and optionally in the presence of an oxidation inhibitor such as hydroquinone. As examples of suitable solvents may be mentioned: ketones, such as methylethyl ketone and cyclohexanone; esters, and ethers, such as glycol ethers. It is preferred that the binder should be obtained by polymerization of 5-14 parts by weight of the epoxy group-free adduct per 100 parts by weight of the monomer mixture.

Polymerization of the monomer mixture in the presence of the epoxy group-free adduct may be carried out by methods known in themselves, use being made of a free radical initiator in an organic solvent at a temperature generally in the range of 10° to 130° C. and applying ultraviolet radiation, if desired. For instance, polymerization may take place with continuous addition of a mixture of the monomers and initiator to a solution of the epoxy group-free adduct and the monomer composition that is chosen may be constant or variable.

Examples of suitable solvents include polar solvents such as ketones, for instance: methylethyl ketone; alcohols, for instance: the monoethyl ether or the monobutyl ether of ethylene glycol; and the ethyl ether of ethylene glycol acetate. Generally, use is made of initiators which have such a half-life period at the chosen polymerization temperature that throughout the polymerization reaction a certain amount of initiator is present. Preferably, the polymerization is continued up to a conversion of the monomer mixture of at least 95%, more particularly 98-100%. Examples of suitable radical initiators include 2.2'-azo-bis-isobutyronitrile, benzoyl peroxide, tert. butyl peroctoate and methylethyl ketone peroxide. The initiator is usually employed in an amount of 0.2-8, preferably 1-7% by weight, based on the weight of the monomer mixture. Optionally, the initiator may be added to the polymerization mixture batchwise.

For the resulting polymerization product to be made cationic and water-soluble, the amino groups present should at least partly be neutralized. This is generally done in a known manner and with the aid of an inorganic or organic acid. Examples of suitable acids include boric acid, phosphoric acid, sulphuric acid, sulphurous acid, hydrochloric acid, formic acid, acetic acid, propionic acid, glycolic acid, thioglycolic acid, diglycolic acid, lactic acid, thiopropionic acid, tartaric acid, malic acid or citric acid. Generally, use is made of mixtures of acids. It is preferred that use should be made of lactic acid. Neutralization may be carried out stepwise, if desired. It is preferred that 30-100% of the available amino groups of the binder should be neutralized. The pH of the composition is generally in the range of 3-7, preferably 4-5.

The preparation of the aqueous coating composition is effected in a simple manner, for instance by adding deionized water to the at least partly neutralized binder to a concentration level of about 30-50% by weight. Subsequently, the resulting solution is diluted with water to a commonly used concentration of 1-35% by weight, preferably 5-20% by weight.

The aqueous coating composition further contains a curing agent for the hydroxyl groups-containing polymerization product. Representative curing agents include blocked polyisocyanates. Examples of suitable polyisocyanates include aliphatic, cycloaliphatic or aromatic diisocyanates such as trimethylene diisocyanate, tetramethylene diisocyanate, hexamethylene diisocyanate, trimethyl hexamethylene diisocyanate, 1,2-propylene diisocyanate, 2,3-butylene diisocyanate, ω,ω'-dipropyl ether diisocyanate, 1,2-cyclohexane diisocyanate, 1,4-cyclohexane diisocyanate, isophorone diisocyanate, dicyclohexylmethane-4,4'-diisocyanate, 3,3'-dimethylcyclohexylmethane-4,4'-diisocyanate, xylylene diisocyanate, 1,5-dimethyl-2,4-bis(isocyanatomethyl)benzene, 1,5-dimethyl-2,4-bis(2-isocyanatoethyl)benzene, 1,3,5-triethyl-2,4-bis(isocyanatomethyl)benzene, 4,4'-diphenylmethane diisocyanate, 2,4-toluene diisocyanate, 2,6-toluene diisocyanate, naphthalene diisocyanate, dianisidine diisocyanate, 4,4'-diphenylether diisocyanate.

Also suitable for use are higher functional polyisocyanates such as the adduct of 3 molecules of hexamethylene diisocyanate and 1 molecule of water (available under the trademark Desmodur N of Bayer), the adduct of 1 molecule of trimethylol propane and 3 molecules of toluene diisocyanate (available under the trademark Desmodur L of Bayer) and the adduct of 1 molecule of trimethylol propane and 3 molecules of isophorone diisocyanate, and compounds such as 1,3,5-triisocyanatobenzene and 2,4,6-triisocyanatobenzene.

Examples of suitable, known blocking agents for the polyisocyanate include alcohols, lactams, hydroxamates and oximes. As examples of suitable alcohols, which may be aliphatic, cycloaliphatic or alkylaromatic, may be mentioned propanol, 1-butanol, 2-butanol, isobutanol and pentanols. Examples of suitable lactams include ε-caprolactam, butyrolactam and 2-pyrrolidone. As examples of suitable oximes may be mentioned ethylmethyl ketoxime. Preference is given to the use of blocked polyisocyanates as curing agents in cases where the aqueous coating composition is to be applied to the substrate cataphoretically. Other curing agents are, for instance, N-methylol and/or N-methylol ether groups-containing aminoplasts obtained by reacting an aldehyde, for example formaldehyde, with an amino or amido groups-containing compound such as melamine, urea, N,N'-ethylene urea, dicyandiamide and benzoguanamine; for the preparation of these compounds see, for instance, Houben-Weyl, Methoden der organischen Chemie, Volume 14/2, pp. 319-371 (1963). It is preferred that the afore-described compounds should entirely or partly be etherified with alcohols having 1 to 6 carbon atoms, for example with methanol, ethanol, n-propanol, isopropanol, n-butanol, isobutanol, amyl alcohol, hexanol or mixtures of the above-envisaged alcohols. Especially, use can be made of a methylol melamine having 4 to 6 methylol groups per melamine molecule, at least 3 methylol groups being etherified with methanol, ethanol, propanol or butanol. More particularly, use can be made of a hexaalkoxymethyl melamine with the alkoxy group having 1 to 4 carbon atoms.

The aqueous coating composition may contain conventional adjuvants and additives, for instance: surface active compounds, anti-sag agents, dispersing agents, antioxidants, dispersion stabilizers, co-solvents, pigments and dyes. As examples of suitable pigments may be mentioned iron oxide, lead oxide, strontium chromate, carbon black, titanium dioxide, talc, silica, barium sulphate, cadmium yellow, cadmium red and phthalocyanine pigments.

As substrate there is used in the present process an electrically conductive substrate, which may for instance be of a pretreated or non-pretreated metal or alloy, such as iron, steel, zinc plated iron, copper, brass, aluminium, or an electrically conductive synthetic material or rubber. The aqueous coating composition may be applied to an electrically conductive substrate for instance by brushing, spraying, dipping, electrostatic spraying, but preferably by cataphoresis. Cataphoresis may be carried out in the usual manner, for instance at a voltage of 50-500, preferably 100-350, and an initial current density of 0.1-40 A/m². If desired, however, the aqueous coating composition may be applied to any electrically non-conductive substrate.

After the coating has been applied to the substrate, it is baked at a temperature of, for instance, 90°-250° C., preferably 110°-200° C. The time required for baking depends on the baking temperature and generally varies between about 5 and 45 minutes.

The invention also pertains to an aqueous coating composition based on a cationic binder. The binder is obtained by polymerization of a monomer mixture in the presence of a polyethylenically unsaturated compound, amino groups present in the binder being at least partially neutralized with an acid. The monomer mixture consists of (a) 1-30% by weight of a hydroxy(cyclo)alkyl (meth)acrylate of which the (cyclo)alkyl group has 2-8 carbon atoms, (b) 4-45% by weight of an amino (meth)acrylate of the formula

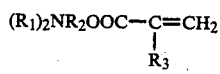

wherein one of the groups $R_1$ is an organic group having 1-12 carbon atoms and the other group $R_1$ is an organic group having 1-12 carbon atoms or a hydrogen atom, or the two groups $R_1$, together with the nitrogen atom attached thereto, form a heterocyclic group, $R_2$ is a hydrocarbon group containing 2-12 carbon atoms and $R_3$ is a hydrogen atom or a methyl group, (c) 0-80% by weight of a monovinyl aromatic hydrocarbon containing 8-14 carbon atoms, and (d) 0-50% by weight of a different monoethylenically unsaturated monomer containing 2-20 carbon atoms. The polyethylenically unsaturated compound is an epoxy group-free adduct of a bisphenol bisglycidyl ether and an ethylenically unsaturated amido amine formed from (a) a polyamine containing 1-2 primary amino groups and 1-2 secondary amino groups and (b) an ethylenically unsaturated monocarboxylic acid containing 18-24 carbon atoms. The adduct is present in an amount of 1-20 parts by weight per 100 parts by weight of the monomer mixture.

The invention will be further described in, but not limited by, the following examples. Unless otherwise indicated, all parts and percentages are by weight. The cured coatings obtained according to the Examples were tested for hardness in conformity with NF T 30-016, for adhesion in accordance with DIN 53151, for flexibility in accordance with NF T 30-040 (cylindrical bending), for gloss in accordance with ASTM D523 (angle of 60°) and for resistance to corrosion by exposure for 400 hours to a salt spray in conformity with ASTM-B-117-64 (the results are expressed as $C_xYA_z$, where x and z denote the degree of rust formation in mm, respectively on either side of the scratch and on the edge of the panel, and the value y=10 means that there was no blistering). The edge covering was assessed by microscope. The thickness of the coating was measured in the cured state.

EXAMPLE 1

In a reactor provided with a stirrer and a reflux condenser 84.42 parts of ricinoleic acid (containing 52% of linolenic acid) were heated to a temperature of 60° C. and subsequently mixed with 15.58 parts of diethylene triamine. The temperature in the reactor rose to 180° C. The reaction was terminated when the acid number of the reaction mixture was 5-7.

Subsequently, 40.9 parts of the amido amine thus prepared were mixed with a mixture heated to 60° C. of 29.1 parts of bisglycidyl ether of bis(4-hydroxyphenyl)-2,2-propane having an epoxy equivalent weight of 450-500 (commercially available under the trademark Epikote 1001 of Shell Chemicals) and 30.0 parts of monobutyl ether of ethylene glycol. The temperature of the reaction mixture was kept at 115° C. for 4 hours. The resulting 70%-solution of the epoxy-amine adduct had a Gardner Holdt viscosity at 25° C. of $Z_3$-$Z_4$.

For the preparation of the binder, 5.1 parts of the previously prepared solution of the epoxy amine adduct were mixed with 36.7 parts of monobutyl ether of ethylene glycol and the solution was heated to a temperature of 100° C. Subsequently, a mixture of 30.7 parts of styrene, 10.8 parts of hydroxyethyl acrylate, 7.7 parts of methyl methacrylate, 6.4 parts of dimethylaminoethyl methacrylate and 0.89 parts of 2.2'-azo-bis-isobutyronitrile was introduced into the reactor over a period of 3 hours in such a way that the temperature of the reactor contents remained between 95° C. and 105° C. After the monomer mixture had been added, the reactor contents were kept at a temperature of 100° C. for 1 more hour. Finally, a mixture of 0.6 parts of 2.2'-azo-bis-isobutyronitrile and 1.2 parts of monobutyl ether of ethylene glycol was added to the reactor contents in 2 equal portions, each of them over a period of 1 hour, in the process of which and for 2 more hours the reaction mixture was kept at a temperature of 95°–105° C. The resulting binder solution had a solids content of 59.9%, and upon dilution with monobutyl ether of ethylene glycol it had a Gardner Holdt viscosity at 25° C. of $Z_4$.

A coating composition was prepared by intermixing 64.0 parts of the afore-described binder solution, 14.0 parts of an 80%-solution of the adduct completely blocked with ε-caprolactam of 3 molecules of hexamethylene diisocyanate and 1 molecule of water, 35.0 parts of rutile titanium dioxide, 6.0 parts of monobutyl ether of ethylene glycol, 1.5 parts of an 85%-aqueous solution of phosphoric acid and deionized water in an amount such that a composition having a solids content of 12.0% was obtained.

The aqueous coating composition was applied to a steel panel (Bonder 132) by cataphoretic deposition at a voltage of 250, a temperature of 25° C. and an initial current density of 20 A/m² to a coating thickness of 35–40 μm and subsequently cured for 25 minutes at a temperature of 180° C. The measured properties of the coating are given in the Table.

EXAMPLE 2

Example 1 was repeated, except that in the preparation of the amido amine use was made of 84.46 parts of ricinoleic acid (containing 41% of linolenic acid) and 15.54 parts of diethylene triamine.

In the preparation of the epoxy amine adduct use was made of 30.3 parts of the bisglycidyl ether and 39.7 parts of the amido amine prepared. Obtained was a solution of a Gardner Holdt viscosity at 25° C. of $Z_4$.

In the preparation of the binder 10.1 parts of the resulting solution of the epoxy amine adduct were mixed with 35.3 parts of the monobutyl ether of ethylene glycol, to which there was added a monomer mixture of 28.8 parts of styrene, 10.1 parts of hydroxyethyl acrylate, 7.3 parts of methyl methacrylate, 6.0 parts of dimethylaminoethyl methacrylate with 0.59 parts of 2,2'-azo-bis-isobutyronitrile. The resulting binder solution had a solids content of 59.3%; upon dilution with monobutyl ether of ethylene glycol to a solids content of 50% the Gardner Holdt viscosity at 25° C. was $Z_3$–$Z_4$.

Finally, the aqueous composition was prepared, applied and baked in the same way as indicated in Example 1. The measured properties of the coating are mentioned in the Table.

EXAMPLE 3

Example 1 was repeated, except that in the preparation of the amido amine use was made of 84.46 parts of ricinoleic acid (containing 41% of linolenic acid) and 15.54 parts of diethylene triamine.

In the preparation of the epoxy amine adduct the epoxy compound used was the bisglycidyl ether of bis(4-hydroxyphenyl)-2,2-propane of an epoxy equivalent weight of 1500–2000 (commercially available under the trademark Epikote 1007 of Shell Chemicals) in an amount of 51.9 parts, and 18.1 parts of the above-described amido amine. The resulting solution of the adduct had a Gardner Holdt viscosity at 25° C. of $Z_2$–$Z_3$.

In the preparation of the binder, 10.1 parts of the resulting solution of the epoxy amine adduct were mixed with 35.2 parts of the monobutyl ether of ethylene glycol, to which there was added a monomer mixture of 28.7 parts of styrene, 10.1 parts of hydroxyethyl acrylate, 7.2 parts of methyl methacrylate, 6.0 parts of dimethylaminoethyl methacrylate with 0.88 parts of 2,2'-azo-bis-isobutyronitrile. The resulting binder solution had a solids content of 59.6%; upon dilution with monobutyl ether of ethylene glycol to a solids content of 50% the Gardner Holdt viscosity at 25° C. was $Z_3$.

Finally, the aqueous composition was prepared, applied and baked as indicated in Example 1. The measured properties of the coating are given in the Table.

EXAMPLE 4

Example 1 was repeated, except that in the preparation of the epoxy amine adduct the epoxy compound used was the bisglycidyl ether of bis(4-hydroxyphenyl)-2,2-propane of an epoxy equivalent weight of 1500–2000 (commercially available under the trademark Epikote 1007 of Shell Chemicals) in an amount of 52.26 parts, and 17.74 parts of the amido amine. The resulting solution of the adduct had a Gardner Holdt viscosity at 25° C. of $Z_3$.

In the preparation of the binder the solution of the epoxy amine adduct was used in an amount of 5.0 parts. The resulting binder solution had a solids content of 59.1%; upon dilution with monobutyl ether of ethylene glycol to a solids content of 50% the Gardner Holdt viscosity at 25° C. was $Z_3$.

Finally, the aqueous composition was prepared, applied and baked in the same way as indicated in Example 1. The measured properties of the coating are given in the Table.

TABLE

| | Examples | | | |
|---|---|---|---|---|
| | 1 | 2 | 3 | 4 |
| Hardness | 330 | 320 | 320 | 310 |
| Adhesion | Gt 0 | Gt 0 | Gt 0 | Gt 0 |
| Flexibility | <30 | <5 | <5 | <5 |
| Edge covering | good | excellent | good | excellent |
| Gloss | >80 | >80 | >80 | >80 |
| Salt spray test | $C_510A_0$ | $C_310A_0$ | $C_310A_0$ | $C_110A_0$ |

We claim:

1. An aqueous coating composition based on a cationic binder obtained by polymerization of 100 parts by weight of a monomer mixture in the presence of a polyethylenically unsaturated compound, said monomer mixture consisting of (a) 1–30% by weight of a hydroxy(cyclo)alkyl (meth)acrylate of which the (cyclo)alkyl group has 2–8 carbon atoms, (b) 4–45% by weight of an amino (meth)acrylate of the formula:

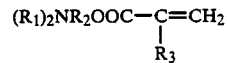

$$(R_1)_2NR_2OOC-\underset{R_3}{C}=CH_2$$

wherein one of the groups $R_1$ is a hydrocarbon group having 1–12 carbon atoms and the other group $R_1$ is a hydrocarbon group having 1–12 carbon atoms or a hydrogen atom, or the two groups $R_1$, together with the nitrogen atom attached thereto, form a heterocyclic group, $R_2$ is a hydrocarbon group containing 2–12 carbon atoms and $R_3$ is a hydrogen atom or a methyl group, (c) 0–80% by weight of a monovinyl aromatic hydrocarbon containing 8–14 carbon atoms, and (d) 0–50% by weight of a different monoethylenically unsaturated monomer containing 2-20 carbon atoms;

said polyethylenically unsaturated compound being an epoxy group-free adduct of a bisphenol bisglycidyl ether and an ethylenically unsaturated amido amine formed from (a) a polyamine containing 1-2 primary amino groups and 1-2 secondary amino groups and (b) an ethylenically unsaturated monocarboxylic acid containing 18-24 carbon atoms, which adduct is present in an amount of 1-20 parts by weight per 100 parts by weight of the monomer mixture;

amino groups present in said binder being at least partially neutralized with an acid.

2. A composition according to claim 1, wherein the hydroxy(cyclo)alkyl (meth)acrylate used in the monomer mixture is at least one member selected from the group consisting of hydroxyethyl acrylate and hydroxypropyl methacrylate.

3. A composition according to claim 1, wherein the monomer mixture contains 5-24% by weight of hydroxy(cyclo)alkyl (meth)acrylate.

4. A composition according to claim 1, wherein the amino (meth)acrylate is a (di)alkylamino (meth)acrylate of which the alkyl group(s) has (have) 1-4 carbon atoms.

5. A composition according to claim 1, wherein the amino (meth)acrylate is a β-(di)alkylaminoethyl (meth)acrylate of which the alkyl group(s) has (have) 1-4 carbon atoms.

6. A composition according to claim 1, wherein the monomer mixture contains 7-35% by weight of amino (meth)acrylate.

7. A composition according to claim 1, wherein the monomer mixture contains 7-28% by weight of amino (meth)acrylate.

8. A composition according to claim 1, wherein the monovinyl aromatic hydrocarbon used in the monomer mixture has 8-10 carbon atoms.

9. A composition according to claim 1, wherein the monovinyl aromatic hydrocarbon used is at least one member selected from the group consisting of styrene and vinyl toluene.

10. A composition according to claim 1, wherein the monomer mixture contains 10-70% by weight of the monovinyl aromatic hydrocarbon.

11. A composition according to claim 1, wherein the monomer mixture contains 0-45% by weight of the different monoethylenically unsaturated monomer.

12. A composition according to claim 1, wherein the bisphenol bisglycidyl ether is the bisglycidyl ether of bis(4-hydroxyphenyl)-2,2-propane.

13. A composition according to claim 1, wherein the bisphenol bisglycidyl ether has an epoxy equivalent weight of 180-4000.

14. A composition according to claim 1, wherein the polyamine is a polyalkylene polyamine of the formula $H_2N-(R_2-NH)-_nR_1-NH_2$, wherein the group $R_1$ and the groups $R_2$ may be the same or different and represent an alkylene group containing 2-6 carbon atoms, and n is 1 or 2.

15. A composition according to claim 1, wherein the binder is obtained by polymerization of 100 parts by weight of the monomer mixture in the presence of 5-14 parts by weight of the epoxy group-free adduct.

* * * * *

UNITED STATES PATENT AND TRADEMARK OFFICE
CERTIFICATE OF CORRECTION

PATENT NO. : 4,735,989

DATED : April 5, 1988

INVENTOR(S) : Chantal GUIOTH et al

It is certified that error appears in the above-identified patent and that said Letters Patent is hereby corrected as shown below:

Column 4, line 56, change "2,4,6-triisocyanatobenzene." to --2,4,6-triisocyanatotoluene.--.

Signed and Sealed this

Nineteenth Day of July, 1988

Attest:

DONALD J. QUIGG

Attesting Officer

Commissioner of Patents and Trademarks